(12) United States Patent
Fujimoto et al.

(10) Patent No.: US 7,565,666 B2
(45) Date of Patent: Jul. 21, 2009

(54) DISK AUTOCHANGER

(75) Inventors: Fumihiko Fujimoto, Kobe (JP); Koichi Ogawa, Kobe (JP); Yasutaka Yamanaka, Kobe (JP); Kenichi Hatata, Kobe (JP)

(73) Assignees: Fujitsu Ten Limited, Kobe-shi (JP); Muramoto Industry Co., Ltd., Kobe-shi (JP)

( * ) Notice: Subject to any disclaimer, the term of this patent is extended or adjusted under 35 U.S.C. 154(b) by 330 days.

(21) Appl. No.: 10/589,834

(22) PCT Filed: May 18, 2005

(86) PCT No.: PCT/JP2005/009502

§ 371 (c)(1),
(2), (4) Date: Aug. 17, 2006

(87) PCT Pub. No.: WO2005/112027

PCT Pub. Date: Nov. 24, 2005

(65) Prior Publication Data

US 2008/0155577 A1    Jun. 26, 2008

(30) Foreign Application Priority Data

May 19, 2004    (JP)    ............... 2004-149359

(51) Int. Cl.
*G11B 17/04* (2006.01)
(52) U.S. Cl. ........................................ 720/623
(58) Field of Classification Search ............... None
See application file for complete search history.

(56) References Cited

U.S. PATENT DOCUMENTS

| | | |
|---|---|---|
| 5,329,516 A | 7/1994 | Hoshi et al. |
| 5,818,723 A | 10/1998 | Dimitri |
| 5,867,470 A * | 2/1999 | Kim et al. ............. 369/30.92 |
| 5,870,245 A | 2/1999 | Kersey et al. |
| 5,970,041 A * | 10/1999 | Inatani et al. ............. 720/706 |
| 6,075,758 A | 6/2000 | Wu |
| 6,157,607 A | 12/2000 | Nakamichi |

(Continued)

FOREIGN PATENT DOCUMENTS

EP    1 383 123 A2    1/2004

(Continued)

OTHER PUBLICATIONS

International Search Report dated Jun. 21, 2005, corresponding to PCT/JP2005/009502.

(Continued)

*Primary Examiner*—Mark Blouin
(74) *Attorney, Agent, or Firm*—Christie, Parker & Hale LLP.

(57) ABSTRACT

A disc autochanger improving on a conventional disc separating mechanism to enable the device to be reduced in size is provided, comprising a plurality of disc holding members 4 (4-1 to 4-6), a splitting member 21 splitting the plurality of disc holding members 4 to separate them at the disc holding member for playback/recording, and an elevator mechanism 6 making the plurality of disc holding members 4 move in the elevation direction to make the disc holding member for playback (recording) move to the position for splitting the disc holding members and further enlarge the split.

11 Claims, 10 Drawing Sheets

U.S. PATENT DOCUMENTS

| | | |
|---|---|---|
| 6,163,511 A | 12/2000 | De Vries |
| 6,215,757 B1 | 4/2001 | Fujimoto et al. |
| 6,240,058 B1 | 5/2001 | Pitz et al. |
| 6,507,542 B1 | 1/2003 | Hopf et al. |
| 6,959,444 B2 * | 10/2005 | Peng .......................... 720/615 |
| 2003/0012089 A1 | 1/2003 | Fujimoto |

FOREIGN PATENT DOCUMENTS

| | | |
|---|---|---|
| EP | 1 650 754 A1 | 4/2006 |
| JP | 3-176852 | 7/1991 |
| JP | 4-61080 | 2/1992 |
| JP | 6-36437 | 2/1994 |
| JP | 7-282526 | 10/1995 |
| JP | 10-83612 | 3/1998 |
| JP | 10-269749 | 10/1998 |
| JP | 2000-48464 | 2/2000 |
| JP | 2000-100045 | 4/2000 |
| JP | 2003-6974 | 1/2003 |

OTHER PUBLICATIONS

Patent Abstracts of Japan, Publication 06036437 A, Published Feb. 10, 1994, in the name of Matsugase, et al.

Patent Abstracts of Japan, Publication 07282526 A, Published Oct. 27, 1995, in the name of Sasaki, et al.

Patent Abstracts of Japan, Publication 10083612 A, Published Mar. 31, 1998, in the name of Sakamoto.

Patent Abstracts of Japan, Publication 10269749 A, Published Oct. 9, 1998, in the name of Tanaka.

Patent Abstracts of Japan, Publication 2000100045 A, Published Apr. 7, 2000, in the name of Tsurumi.

European Search Report dated Nov. 11, 2008, for corresponding European application 05743527.3, indicating relevance of listed references in this IDS.

* cited by examiner

FIG.5
(1)
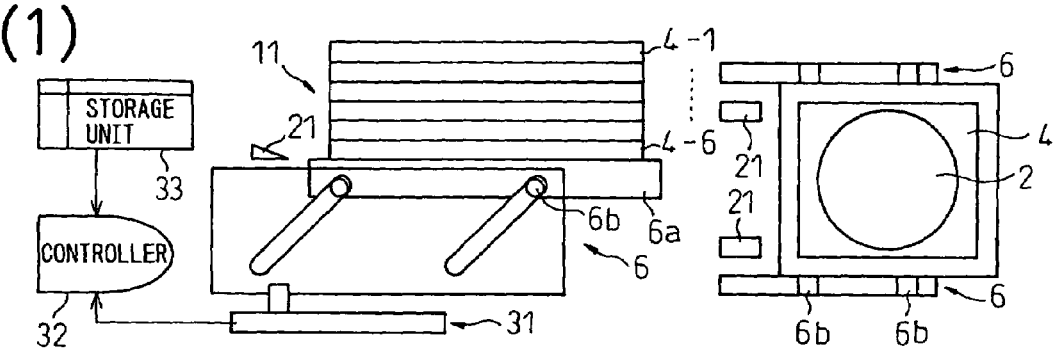
(2)
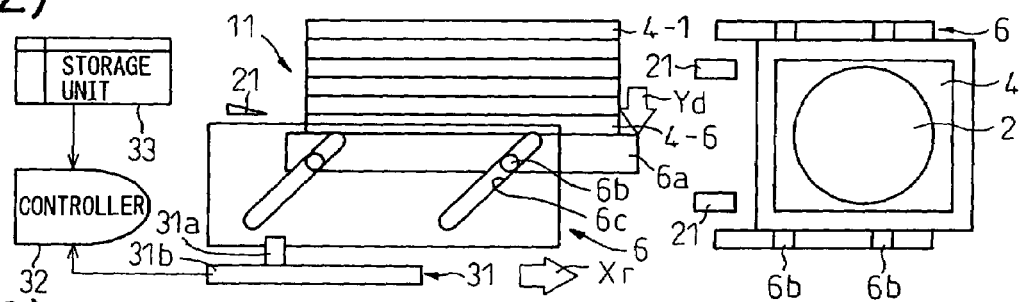
(3)
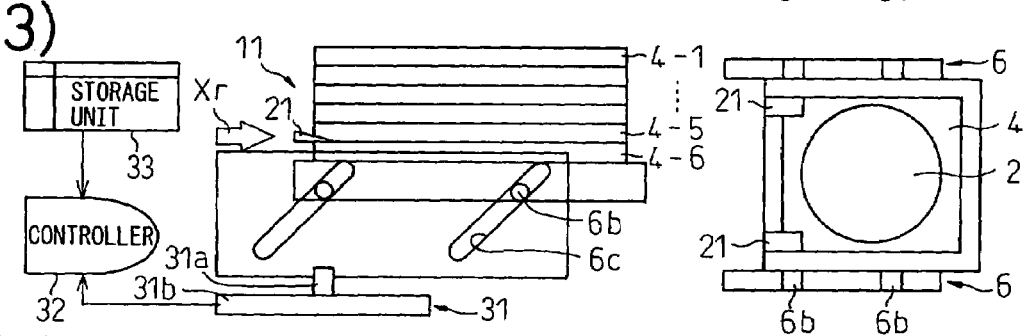
(4)
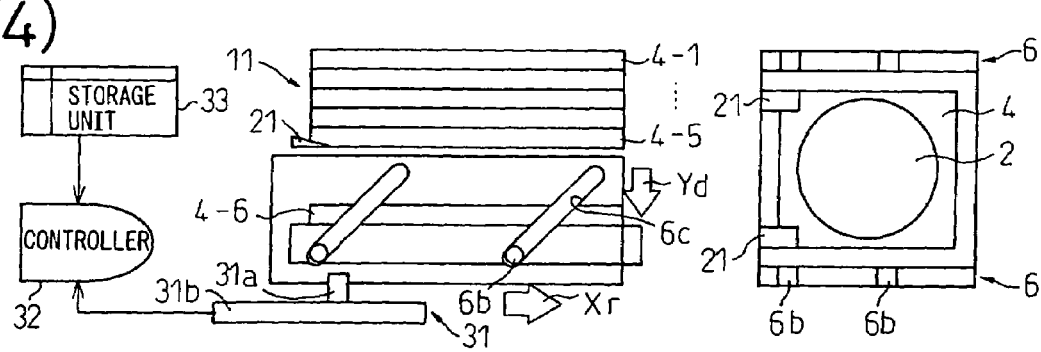

FIG.6
(1) PRIOR ART
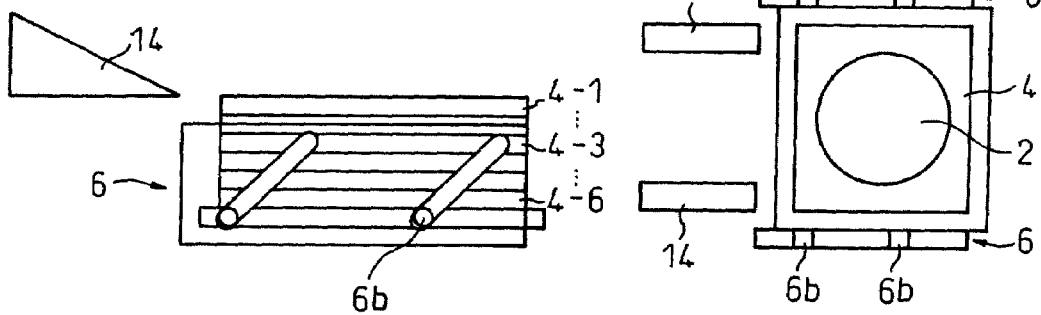
(2) PRIOR ART
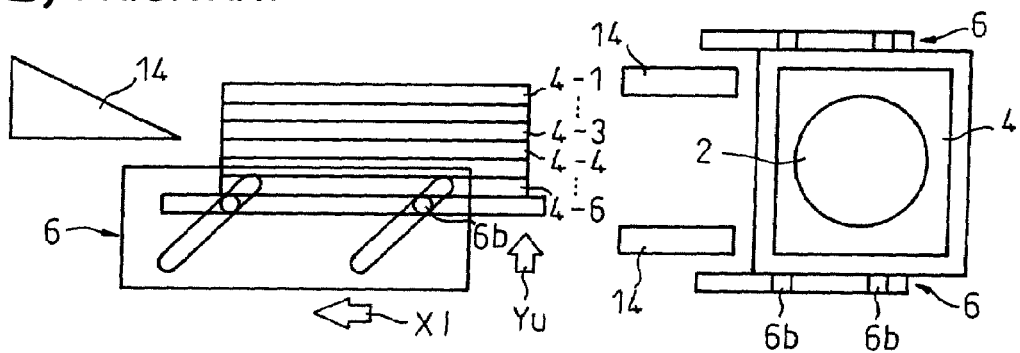
(3) PRIOR ART
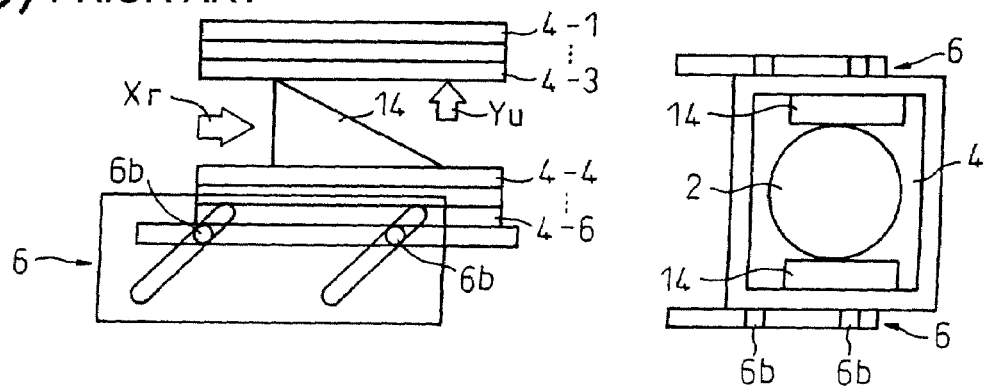

| STOP POSITION | VALUES AT FOUR MEMBER VERSION | | | | VALUES AT SIX MEMBER VERSION | | | | | |
|---|---|---|---|---|---|---|---|---|---|---|
| | 1ST MEMBER | 2ND MEMBER | 3RD MEMBER | 4TH MEMBER | 1ST MEMBER | 2ND MEMBER | 3RD MEMBER | 4TH MEMBER | 5TH MEMBER | 6TH MEMBER |
| LOAD/EJECT PREPARATION | 9A | A9 | B9 | DB | 92 | A2 | B1 | C1 | D0 | F2 |
| ORIGIN | 8A | 9A | A9 | B9 | 83 | 92 | A2 | B1 | C1 | D0 |
| DRIVE THROUGH | 62 | 71 | 81 | 90 | 5A | 6A | 79 | 89 | 98 | A8 |
| TURNTABLE | 4F | 5F | 6E | 7E | 48 | 57 | 67 | 76 | 86 | 95 |
| TRANSFER | 0D | 1C | 2C | 3B | 0D | 1C | 2C | 3B | 4B | 5A |

FIG.9
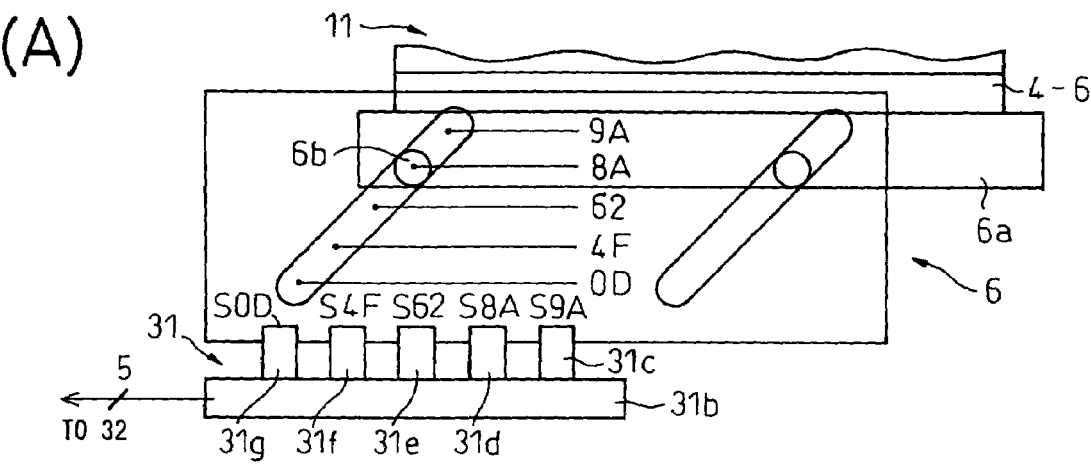
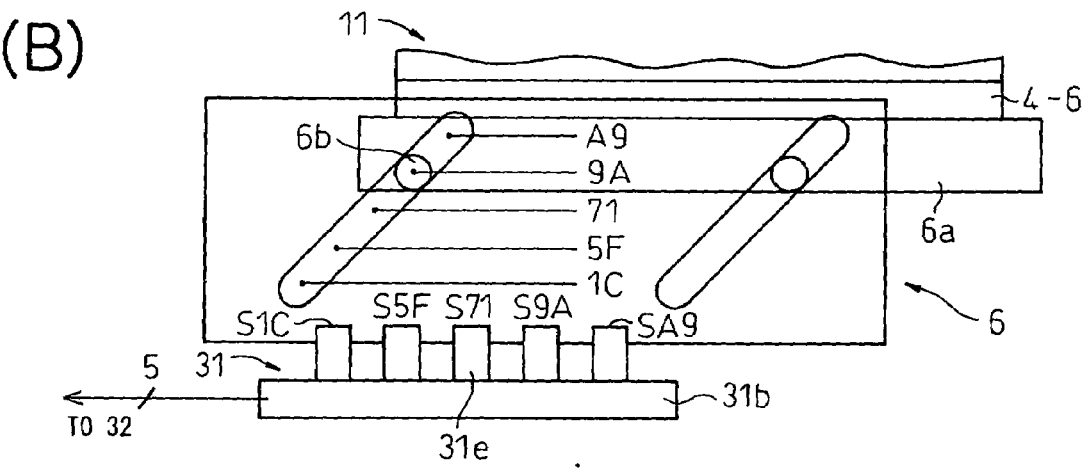
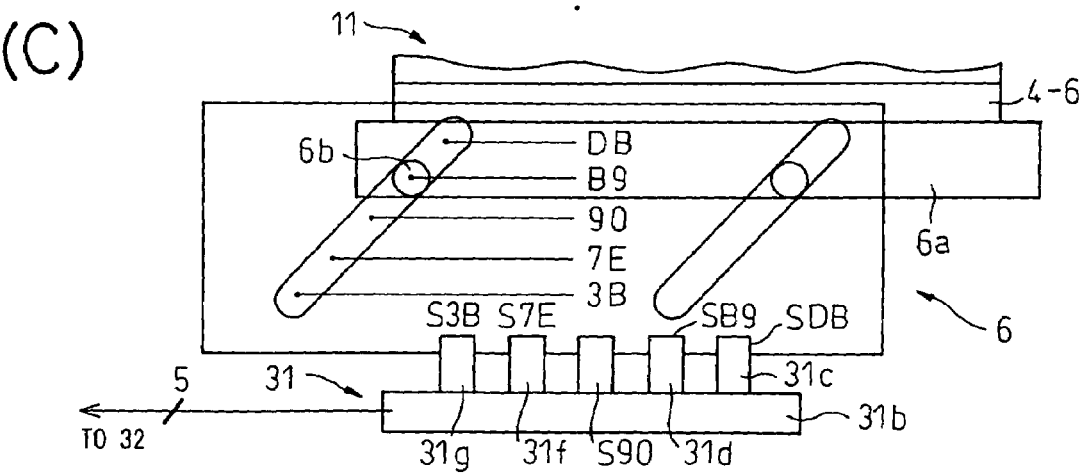

FIG.11

| STOP POSITION | | VALUE |
|---|---|---|
| 1ST MEMBER (FIRST STOCKER) | STOP TARGET | 2D |
| | UPPER LIMIT AT JUDGMENT | 1B |
| | LOWER LIMIT AT JUDGMENT | 3F |
| 2ND MEMBER (SECOND STOCKER) | STOP TARGET | 52 |
| | UPPER LIMIT AT JUDGMENT | 40 |
| | LOWER LIMIT AT JUDGMENT | 64 |
| 3RD MEMBER (THIRD STOCKER) | STOP TARGET | 77 |
| | UPPER LIMIT AT JUDGMENT | 65 |
| | LOWER LIMIT AT JUDGMENT | 89 |
| 4TH MEMBER (FOURTH STOCKER) | STOP TARGET | 9C |
| | UPPER LIMIT AT JUDGMENT | 8A |
| | LOWER LIMIT AT JUDGMENT | AE |
| 5TH MEMBER (FIFTH STOCKER) | STOP TARGET | C1 |
| | UPPER LIMIT AT JUDGMENT | AF |
| | LOWER LIMIT AT JUDGMENT | D3 |
| 6TH MEMBER (SIXTH STOCKER) | STOP TARGET | E6 |
| | UPPER LIMIT AT JUDGMENT | D4 |
| | LOWER LIMIT AT JUDGMENT | F8 |

DISK AUTOCHANGER

CROSS-REFERENCE TO RELATED APPLICATION

This application is a National Phase Patent Application of International Application Number PCT/JP2005/009502, filed on May 18, 2005, which claims priority of Japanese Patent Application Number 2004-149359, filed on May 19, 2004.

TECHNICAL FIELD

The present invention relates to a disc autochanger for automatically selecting a desired disc to be played back/recorded (played back or recorded on) from a plurality of stored CDs, MDs, or other discs and automatically transporting this to the playback/recording means.

BACKGROUND

As an already known disc autochanger, for example, there are the following [Patent Document 1], [Patent Document 2], etc. These Prior Art 1 [Patent Document 1] and Prior Art 2 [Patent Document 2] are summarized below:

FIG. 12 is a view showing an outline of the Prior Art 1.

In the figure, the disc autochanger 1 shown in the Prior Art 1 (Japanese Patent Publication (A) No. 2003-6974) is provided with a first disc holder 11 able to store a plurality of discs 2 and a second holder 12 able to store a plurality of discs 2. To secure the space required for a playback/recording part 3 to play back (or record) above or below a disc 2-4 desired to be played back (or recorded on), discs 2 are transferred between the first disc holder 11 and second disc holder 12. Due to this, even during playback (recording), insertion of discs 2 becomes possible and therefore user friendliness is improved. Further, by making the discs 2 (2-1, 2-2, and 2-3) stored in the first disc holder 11 and the discs 2 (2-5) stored in the second disc holder 12 and disc 2 being played back (2-4) at least partially overlap on a projection plane, the device can be made smaller in size.

Note that the reference numerals 4 (4-1 to 4-6) in the figure show the disc holding members, while 5 shows a load/eject mechanism of discs 2 (in the FIG., 2-6).

Next, looking at the above-mentioned Prior Art 2, FIG. 13 is a view showing an outline of the Prior Art 2.

In the figure, the disc autochanger 1 shown in Prior Art 2 (Japanese Patent Publication (A) No. 2000-48464) is a device forming a disc holder 11 able to store a plurality of discs 2 by members of the same configuration and able to separate them at any storage position.

The disc holder 11 provided in the housing 13 of this disc autochanger 1 is formed by stacking a plurality of disc holding members 4 comprised of members of the same configuration. Each disc holding member 4 can store a disc 2. An elevator mechanism 6 raises or lowers the disc holder 11 as a whole to change its position. In this case, the separating member 14 pushes apart the adjoining disc holding members 4 in the disc holder 11 selected by the change in elevation to form a space enabling insertion of the playback/recording part 3.

[Patent Document 1] Japanese Patent Publication (A) No. 2003-6974

[Patent Document 2] Japanese Patent Publication (A) No. 2000-48464

According to the disc autochanger 1 (FIG. 12) of the above Prior Art 1, two disc holders, that is, a first disc holder 11 and second disc holder 12, are introduced. For this reason, this has the demerits that the housing 13 ends up becoming larger in size overall and further the cost is increased.

An example of a disc autochanger able to eliminate these demerits is the disc autochanger 1 of the Prior Art 2 shown in FIG. 13. According to this disc autochanger 1, there is only one disc holder (11), so the above demerits are eliminated.

However, according to the disc autochanger 1 (FIG. 13) of this Prior Art 2, in addition to the elevator mechanism 6, the separating member 14 becomes an essential component. For this reason, there is the problem that it is difficult to make the housing 13 as a whole remarkably smaller in size. Note that this problem will be explained in detail later with reference to FIG. 3 and FIG. 4.

Therefore, the present invention, in consideration of the above problems, has as its object the provision of a disc autochanger provided with a separating mechanism (14 etc. in FIG. 13) enabling a playback/recording part 3 to be inserted at the position of a disc holding member 4 holding a disc to be played back/recorded on and enabling the housing to be easily made small in size.

SUMMARY

FIG. 1 is a side view of a disc autochanger according to the present invention. Further, FIG. 2 is a side view of a disc autochanger according to the Prior Art 2 (FIG. 13).

The disc autochanger 1 according to the present invention is a disc autochanger provided with disc holding members able to hold a plurality of discs, a splitting member for insertion in said disc holding members so as to separate said disc holding members, and an elevator mechanism for raising or lowering said disc holding members to a position for insertion of said splitting member and for raising or lowering at least part of said disc holding members so as to enable insertion of a playback part, wherein referring to FIG. 1, at least (i) a plurality of disc holding members 4 (4-1 to 4-6) able to hold stacked the plurality of discs 2, (ii) a splitting member 21 for splitting the stacked plurality of disc holding members 4 to separate them in the elevation direction at the disc holding member (for example 4-6) holding the disc to be played back/recorded on, and (iii) an elevator mechanism 6 for moving the plurality of disc holding members 4 in the elevation direction to move the disc holding member holding the disc to be played back/recorded on to a position for splitting by the splitting member 21 and splitting and enlarging the split so as to enable said playback/recording part 3 to be inserted are provided.

Among the above components (i) to (iii), the one characterizing the present invention is the (ii) splitting member 21. This splitting member 21 creates a space for insertion of the playback/recording part 3 among the stacked disc holding members 4, without employing the conventional large sized separating mechanism (for example, like the separating member 14), by simple hooking tabs for starting the creation of that space. Note that in FIG. 1, Xr (right) indicates movement of the elevator mechanism 6 in the right direction, while Yd (down) indicates movement of the disc holding member 4-6 in the down direction.

On the other hand, referring to FIG. 2 showing the Prior Art 2, in this disc autochanger 1, in order to create a space for insertion of the playback/recording part 3 among the stacked disc holding members 4 (4-1 to 4-6), the elevator mechanism 6 is used to make the disc holding member 4 of the disc to be played back/recorded on (for example 4-3) move to the position facing the separating member 14, then this separating member 14 proceeds in the right direction Xr, and the disc holding members 4-1 to 4-3 are lifted up together in the up direction Yu (up) to create the space for insertion of the playback/recording part 3.

Here, the disc autochanger 1 of FIG. 1 (the present invention) and the disc autochanger of FIG. 2 (Prior Art 2) will be compared by their plan views.

FIG. 3 is a plan view of the disc autochanger according to the present invention, while FIG. 4 is a plan view of a disc autochanger according to the Prior Art 2 (FIG. 13).

Note that FIG. 3 and FIG. 4 are plan views in the state shown in FIG. 1 and FIG. 2.

Comparing FIG. 3 and FIG. 4, both have similar components 2, 4, and 6 (6b etc.), so there are no major differences between the figures in terms of these components.

However, if comparing the splitting member 21 (FIG. 3) and the separating member 14 (FIG. 4), a large difference is seen between the two. This relates to the total strokes (S) of these members in the housing 13.

That is, compared with the total stroke S2 (14'←→14) of FIG. 4 of the separating member 14 in the Prior Art 2, the total stroke S1 (21'←→21) of FIG. 3 of the splitting member 21 in the present invention is much different. Of course, S1<<S2.

As a result, there is no longer any restriction on space in laying out the various components to be placed in the housing 13 and therefore it becomes possible to freely select the layout of the components. Further, since the splitting member 21 itself is comprised of small tabs, even including the small-sized drive mechanism (X-direction drive), the space occupied in the housing 13 by the splitting member does not pose almost any problem at all.

Accordingly, the object of more greatly reducing the size of the disc autochanger 1 can be easily achieved.

BRIEF DESCRIPTION OF THE DRAWINGS

FIGS. 5(1) to (4) are side views and plan views indicating the order of the operation steps of Example 1 of the present invention.

FIGS. 6(1) to (3) are side views and plan views indicating the order of operation steps of the Prior Art 2 (FIG. 2).

FIG. 7 is a view showing a correspondence table in a controller.

FIGS. 9(A) to (C) are views showing a detector employed in Example 2 of the present invention.

FIG. 11 is a view of an example of the value of output from a sensor in the storage unit shown in FIG. 10.

BEST MODE FOR WORKING THE INVENTION

Figure 4:
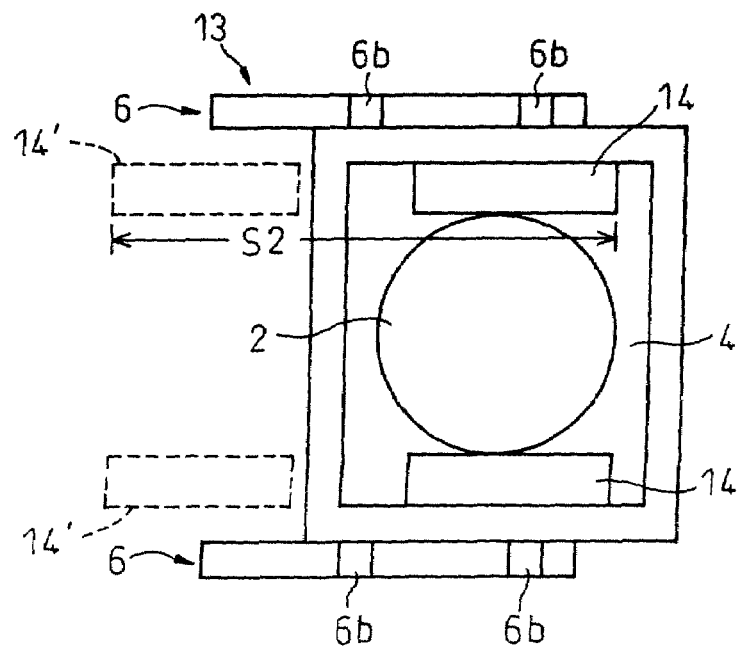
FIG. 4 is a plan view of a disc autochanger according to the Prior Art 2 (FIG. 13).

FIGS. 5(1), (2), (3), and (4) are side views (centers) and plan views (right sides) showing the order of operation steps of Example 1 of the present invention. Further, FIGS. 6(1), (2), and (3) are side views and plan views showing the order of operation steps of the Prior Art 2 (FIG. 4). Note that to facilitate understanding, parts which are originally not visible are also drawn by solid lines.

First, referring to FIG. 5, the components essential for Example 1 are a detector 31, controller 32, and storage unit 33.

The detector 31 shifts an elevator mechanism 6 in a direction (X) substantially perpendicularly intersecting the elevation direction (Y) and makes the disc holding members 4 (4-1 to 4-2) move in the elevation direction (Y) and detects at least one shift position for making that movement stop at a position facing a splitting member 21.

The storage unit 33 stores the number of a disc to be played back/recorded on.

Further, the controller (microprocessor) 32 controls the drive of the splitting member 21 and elevator mechanism 6 in accordance with the outputs of the storage unit 33 and detector 31.

Due to the above explained parts (3, 6, 21, 31, 32, and 33), the disc autochanger 1 operates by the following steps:

(1) In the first step, the elevator mechanism 6 is at the illustrated initial position, the splitting member 21 is at the illustrated position, and the disc holding members 4 (4-1 to 4-6) are at the overall illustrated highest positions. Note that the splitting member 21 is at a fixed position (height) in the vertical direction (Y), but can be moved in the left-right direction (X) at that fixed position by a drive mechanism (not shown).

Here, next, assume that the number of the disc to be played back/recorded on is designated by the user. In the example of this figure, assume that the disc no. 4-6 corresponding to the disc 4-6 is designated. This disc no. 4-6 is stored in the storage unit 33.

(2) In the second step, the controller (microprocessor) 32 makes the elevator mechanism 6 move in the right direction Xr by a drive mechanism (not shown) in accordance with a predetermined program. Due to this movement in the right direction Xr, projections 6b slidably engaging with inclined slits 6c of the elevator mechanism 6 are pushed down in the down direction Yd. Along with this, simultaneously, the table seat member 6a of the elevator mechanism 6 descends in the down direction Yd. Therefore, the disc holding members 4 (4-1 to 4-6) placed on the table seat member 6a descend as a whole (Yd).

In this case, the sensor unit 31a of the fixed detector 31 constantly detects the shift position of the elevator mechanism 6 shifting in the left-right direction (X) and sends the detection results to the controller 32 at all times.

This controller 32 holds a correspondence table between at least one shift position to be taken by each of the plurality of discs and the disc numbers. Details of this correspondence table will be explained later with reference to FIG. 7. According to the above example, the disc number is No. 4-6, so whether the stop position in the Yd direction to be taken in the case of the disc 4-6 (position where disc 4-6 faces splitting member 21) is reached is calculated from the above shift position detected by the sensor unit 3a of the detector 31.

(3) In the third step, when the controller 32 judges that the value showing the shift position detected by the above sensor unit 31a matches with the value corresponding to the above stop position assigned to the disk no. 4-6, the controller 32 stops the movement of the elevator mechanism 6 in the right direction Xr. Further, at this stop position, when pushing the splitting member 21 in the Xr direction of FIG. 5(3), it splits apart the disc holding member 4-6 and the adjoining disc holding member 4-5. After this, the disc holding members 4-5 to 4-1 remain constrained at that position by the splitting member 21.

(4) In the fourth step, leaving the disc holding members 4-1 to 4-5 at the position of the third step, the controller 32 makes the elevator mechanism 6 move further in the right direction Xr. Here, the disc holding members 4-1 to 4-5 and 4-6 are sufficiently separated and the space between the members is further enlarged.

Figure 13:
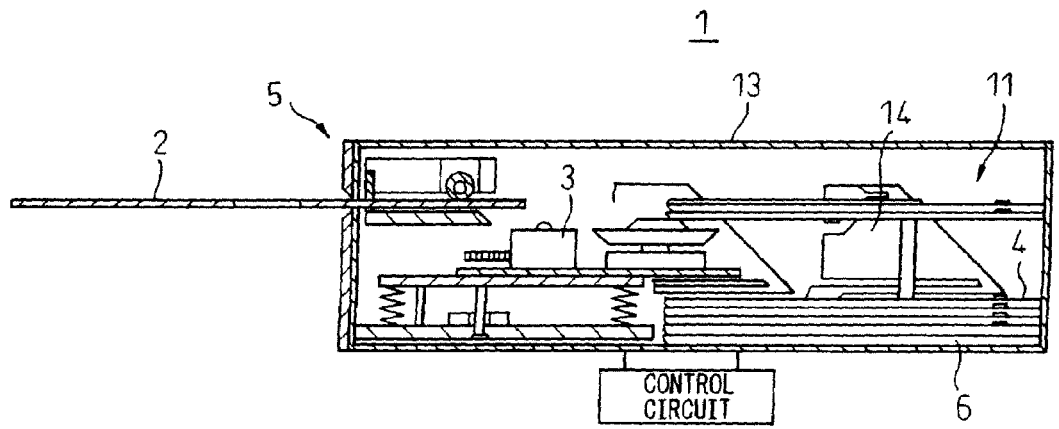
FIG. 13 is a view showing an outline of the Prior Art 2.

Utilizing this enlarged space, the playback/recording part 3 shown in FIG. 13 starts to function.

In the above way, a first aspect of the disc autochanger of the present invention has disc holding members able to hold a plurality of discs, a table seat member for supporting said disc holding members, an elevator mechanism for raising and lowering said table seat member, and a splitting member inserted at a predetermined position of said disc holding members positioned by said elevator mechanism, said elevator mechanism lowering said table seat member after said splitting member is inserted into said disc holding members.

Further, a second aspect of the disc autochanger of the present invention has disc holding members able to hold a plurality of discs, a playback part able to be inserted into a separated space of said disk holding members, a table seat member for supporting said disc holding members, an elevator mechanism for raising or lowering said table seat member, and a splitting member inserted at a predetermined position of said disc holding members positioned by said elevator mechanism, said elevator mechanism lowering said table seat member after said splitting member is inserted into said disc holding members so as to split said disc holding members into disc holding members supported by said splitting member and disc holding members supported by said table seat member and said playback part playing back a disc in the formed separated space.

Further, the autochanger has a controller provided with a position detector for detecting a position of said table seat member and controlling said elevator mechanism based on said position detector so as to move said table seat member to a position corresponding to a desired separation position of the disc stockers.

Figure 1:
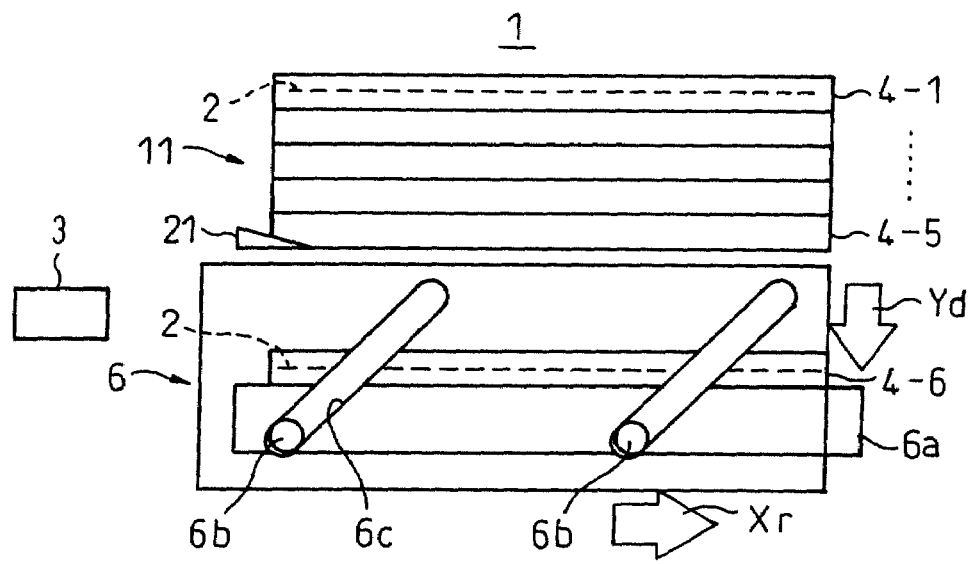
FIG. 1 is a side view of a disc autochanger according to the present invention.
Figure 2:
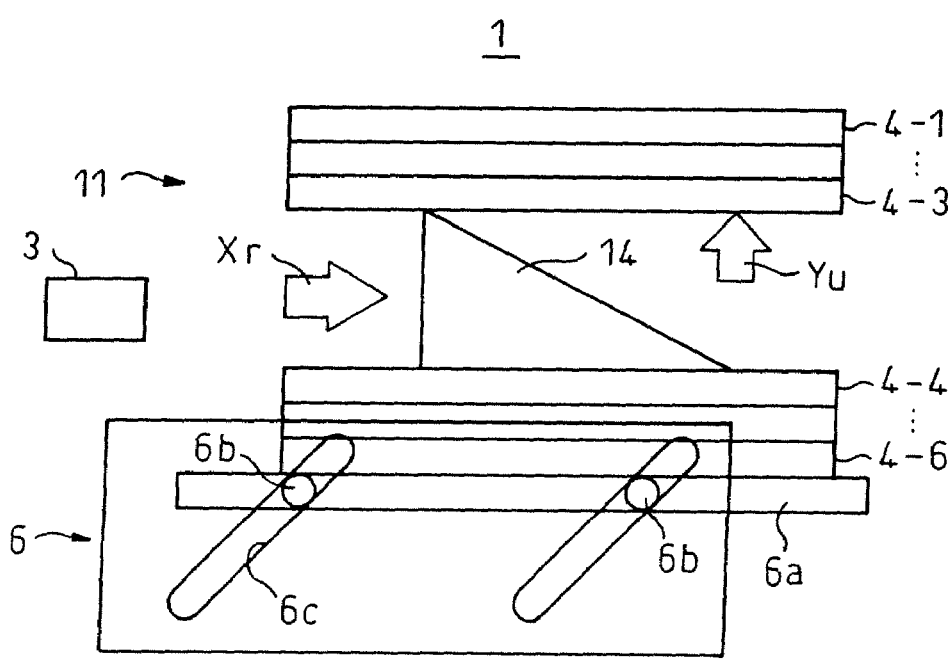
FIG. 2 is a side view of a disc autochanger according to the Prior Art 2 (FIG. 13).
Figure 3:
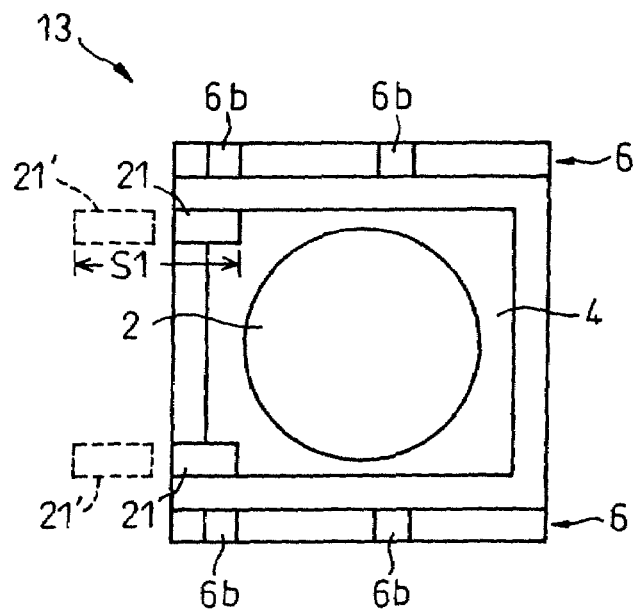
FIG. 3 is a plan view of a disc autochanger according to the present invention.

The operation of the present invention (FIG. 1) explained with reference to FIG. 5 above differs considerably from the operation of the Prior Art 2 (FIG. 2). This is shown in FIG. 6 in comparison with FIG. 5.

Referring to FIG. 6, (1) at the first step, the separating member 14, elevator mechanism 6, and disc holding members 4 (4-1 to 4-6) are at the illustrated initial positions.

Note that in the example of these figures, assume that the disc (No. 4-3) held at the disc holding member 4-3 is the disc to be played back/recorded on.

(2) At the second step, the elevator mechanism 6 is made to move in the left direction X1 and due to this the disc holding members 4-1 to 4-6 as a whole are made to move in the up direction Yu.

(3) At the third step, due to the movement of the disc holding members 4-1 to 4-6 as a whole in the up direction (Yu), the boundary between the above disc holding member 4-3 in question and the adjoining disc holding member 4-4 matches with the position of the front end of the separating member 14. Note that the separating member 14 is at a fixed position (height) in the vertical direction (Y), but can move in the left-right direction (X) at that fixed position by a drive mechanism (not shown).

Then, the separating member 14, in the state with the elevator mechanism 6 stopped, starts to move in the right direction Xr and lifts up the disc holding members 4-3 to 4-1 as a whole in the up direction (Yu) to create a large space. The playback/recording part 3 (FIG. 13) is inserted in that space.

As clear from the comparison of the above-mentioned FIG. 5 and FIG. 6, the present invention (FIG. 1) and the Prior Art 2 (FIG. 2) both use common functional parts, but differ considerably in operating principle. As a result, according to the present invention, the above-mentioned inherent merit is given of the "ease of reduction of size of the device".

Here, the above-mentioned detector 31 and the already explained correspondence table in the controller 32 will be explained in further detail.

FIG. 7 is a view of the correspondence table in the controller 32.

In the figure, the correspondence table 34 stored in for example a ROM in the controller 32 stores a predetermined correspondence between predetermined positions in the stacking direction (Y) where the disc holding members (4-1 to 4-6) should stop, that is, the "stop positions", and values of the predetermined shift positions.

Referring to FIG. 7, the left end shows five types of the above "stop positions". Their meanings may be understood from the descriptions to the right:

Stop position: DETECTING POSITION
Load/eject preparation: LOAD/EJECT (load/eject mechanism 5)
Origin: HOME POSITION (splitting position 21)
Drive through: SLIDE DRIVE UNIT (playback/recording part 3)
Turntable: PLACE DISC
Transfer: TRANSFER DISCS For example, when providing a four-member version disc holding member 11 and the disc to be played back/recorded on is at the first member among the four, the following are set:

When at the "load/eject preparation", the "stop position"=9A
When at the "origin", the "stop position"=8A
When at the "drive through", the "stop position"=62
When at the "turntable", the "stop position"=4F
When at the "transfer", the "stop position"=0D.

Note that the right end 9A, 8A . . . etc. are indicated by hexadecimal notation.

Figure 8:
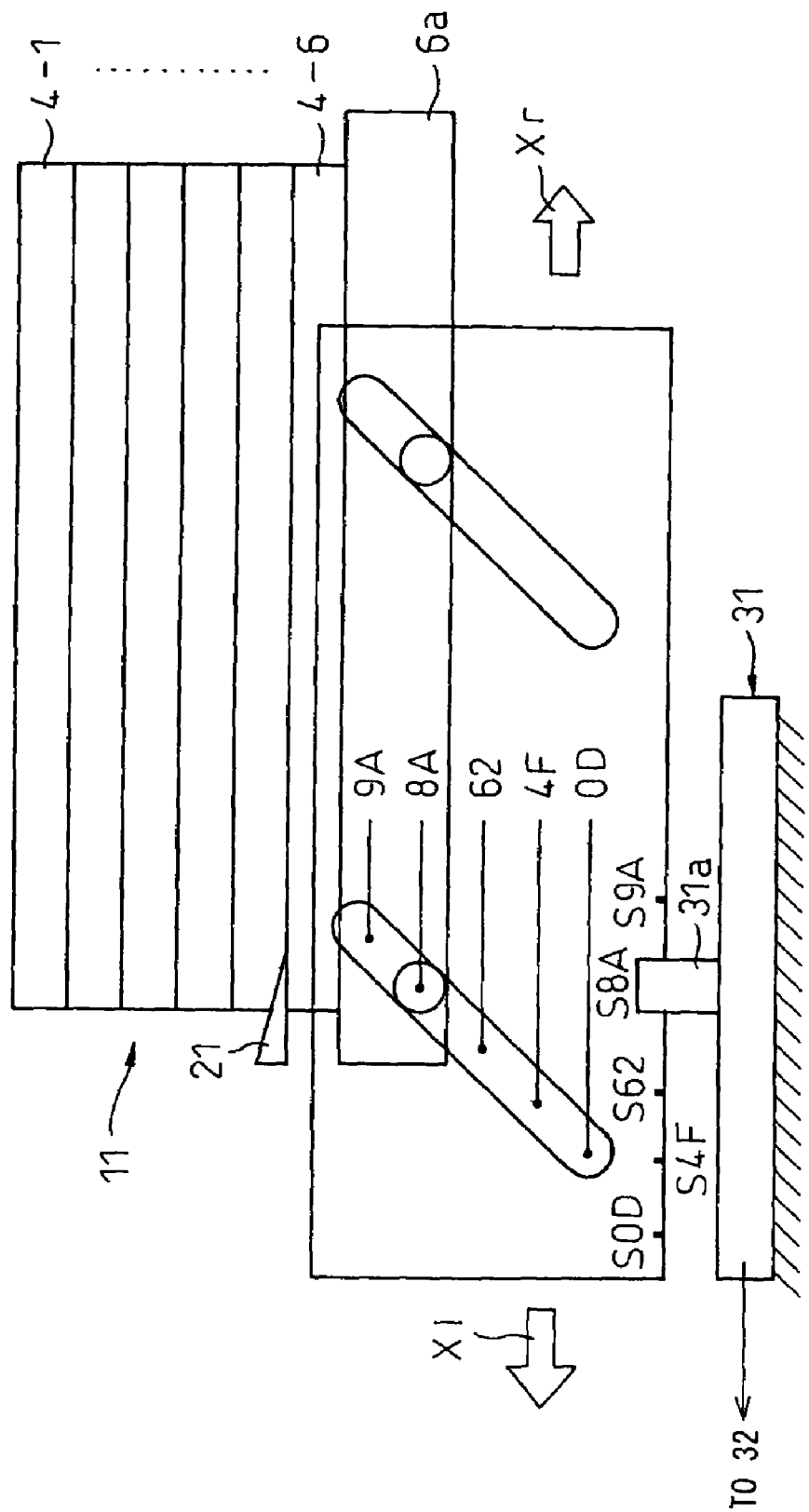
FIG. 8 is a view illustrating the relationship between the "stop positions" and "shift positions".

The relationship between the above "stop positions" and the already explained "shift positions" of the sensor unit 31a at the step of FIG. 5(3) may be expressed as shown in FIG. 8.

FIG. 8 is a view illustrating the relationship between the "stop positions" and "shift positions".

In the figure, when, for example, at the above "load/eject preparation", the elevator mechanism 6 has to be shifted to the left direction to make the projection 6b match with the "stop position" 9A. That is, the elevator mechanism 6 is shifted to the left until the "shift position" S9A matches with the sensor unit 31a.

Further, when, for example, at the "transfer", the elevator mechanism 6 has to be shifted in the right direction to make the projection 6b match with the "stop position" 0D. That is, the elevator mechanism 6 is shifted to the right until the "shift position" S0D matches with the sensor unit 31a.

The present invention is characterized in the step of splitting->separation by the splitting member 21. In this case, when the projection 6b reaches the above "origin" constituted by the "stop position" 8A, the elevator mechanism 6 has to stop being driven. FIG. 8 shows this step. When detecting that the sensor unit 31a matches with the "shift position" S8A, the controller 32 stops driving the elevator mechanism 6 and then starts up the above-mentioned splitting operation by the splitting member 21.

Therefore, in Example 1 shown in FIG. 5, the detector 31 is comprised of a fixed base member 31b and a single sensor unit 31a provided at this fixed base member 31b and connected to the controller (microprocessor) 32. This single sensor unit 31a detects the above shift positions (S9A, S8A . . .) of the elevator mechanism 6.

As the detector 31, one of another configuration is also possible. This is shown as Example 2 of the present invention.

FIG. 9 is a view of the detector 31 employed in Example 2 of the present invention.

The detector 31 in Example 2 is comprised of a base member 31b and a plurality of sensor units 31c, 31d, 31e, 31f, and 31g provided at this base member 31b and connected to the controller 32. These plurality of sensor units 31c to 31g are arranged at the above-mentioned shift positions corresponding to the predetermined positions (said "stop positions") in the elevation direction where the disc holding members should stop. This base member 31b can move to the "shift positions" corresponding to the individual disc holding members (4-1 to 4-6).

Note that FIGS. 9(A), (B), and (C) show the above "shift positions" corresponding to the time of the first member, the time of the second member, and the time of the fourth member (the time of the third member omitted) in the four-member version in the correspondence table 34 of FIG. 7. The interrelationship among the above five types of "stop positions" is immovable. The fact that even if the disc covered differs, this immovable interrelationship merely moves in parallel is taken note of. The detector 31 of Example 1 performs the detection processing shown in FIGS. 9(A), (B), and (C) by a single sensor unit 31a, so the processing load of the microprocessor forming the controller 32 becomes large. On this point, in Example 2, judgment of the stop positions corresponding to the disc numbers becomes unnecessary, and the processing load of the above microprocessor becomes small. However, the hardware size becomes large. Note that if the above-mentioned sensor unit is a magnetic type, it is sufficient to provide small magnetic strips at the above shift positions, while if the sensor unit is an optical type, it is sufficient to provide small reflection films or open slits at the above shift positions. Alternatively, a gear-equipped slide-type variable resistor may be provided.

However, both in the case of Example 1 and in the case of Example 2, the detection results read from the sensor units (31a and 31c to 31g) are recorded once in the RAM in the above controller (microprocessor) 32.

For this reason, when the power of the disc autochanger 1 is turned off for some reason or another (either by human hand or by accident), said microprocessor is reset and the stored content of the above RAM ends up being completely lost.

This being so, when the power is again turned on, at the time of this restart, the device does not know at all which disk it was able to process right before. Therefore, after this, either a mistaken operation will be caused or no operation at all becomes possible and the current state cannot be restored.

To deal with this situation, the present invention provides two techniques.

The first technique configures the storage unit 33 by a nonvolatile memory storing the disc numbers of the discs to be played back/recorded on. Since it is a nonvolatile memory, the disc numbers are held without regard as to whether the power is on or off.

The second technique is applied to the case where the storage unit 33 is not such a nonvolatile memory. This storage unit 33 is comprised of a drive mechanism driven based on the output of the controller 32 and a sensor for detecting dynamic changes of this drive mechanism and is designed to calculate the number of the disc to be played back/recorded covered from the value of the output of this sensor. If illustrating this, the result becomes like in FIG. 10. However, the disc number first designated from the user side is directly written into the RAM in the microprocessor (32).

Figure 10:
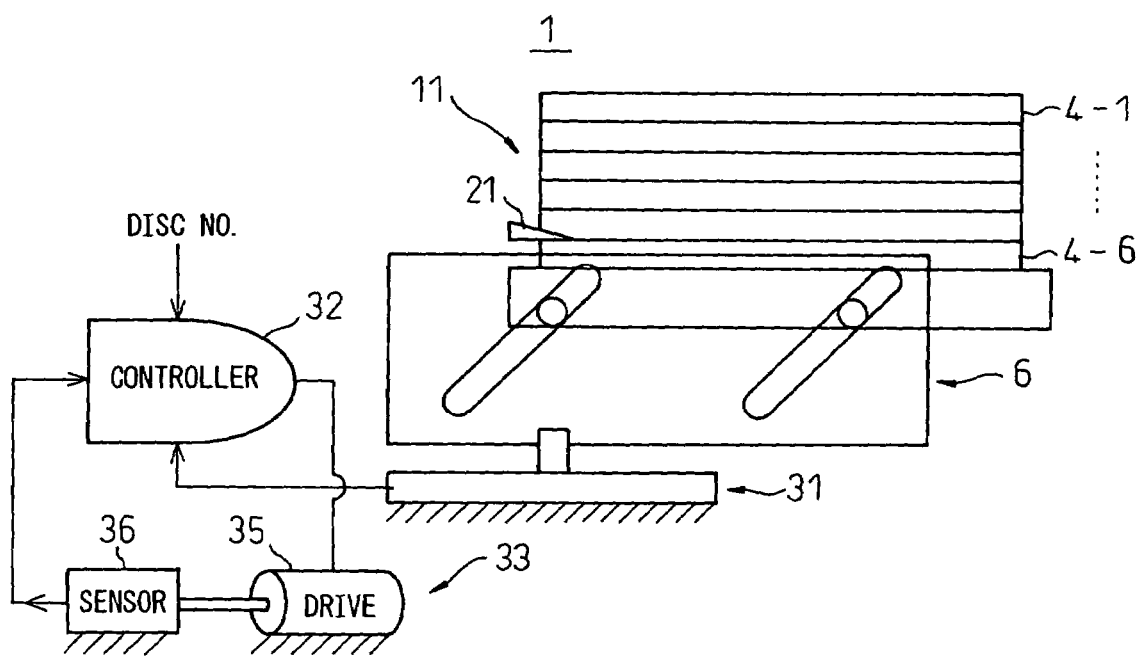
FIG. 10 is a view of a storage unit employed in Example 3 of the present invention.
Figure 12:
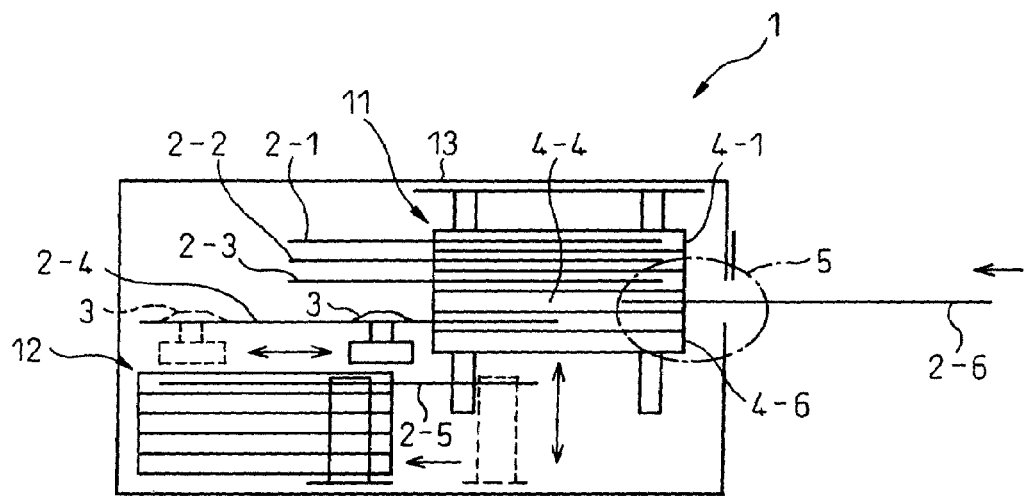
FIG. 12 is a view showing an outline of the Prior Art 1.

FIG. 10 is a view showing the storage unit 33 of Example 3 of the present invention.

In the figure, the above-mentioned drive mechanism and sensor are shown by the reference numerals 35 and 36.

The drive mechanism 35 is for example a motor. The rotational displacement of this motor changes the output value of the sensor 36. The output of this sensor 36 is an analog or digital value.

More specifically, the above motor (35) is designed to have correlation with the stop positions of the disc holding members 4-1 to 4-6. An example of the values of the output of the sensor 36 corresponding to the disc holding members (STOCKER) is shown in FIG. 11.

FIG. 11 is a view showing an example of the values of the output from the sensor 36 in a storage unit 33 of the type of FIG. 10.

This figure shows an example of a six-member version. This shows the judgment value providing a hint as to which stocker was to be played back/recorded right before the power turned off and the original target value for each of the first member (FIRST STOCKER) to sixth member (SIXTH STOKER) of the disc holding members 4-1 to 4-6. The judgment values are given a range of an upper limit and lower limit. The microprocessor (32) judges which range the output value of the sensor 36 is in and resets the target value based on this when the power again turns on.

INDUSTRIAL APPLICABILITY

The invention can be applied to an audio system, computer system, etc. required to store a plurality of disc shaped data storage media in a single housing and load, play back/record on, and eject any one automatically and is particularly beneficial in reducing the size of said system.

The invention claimed is:

1. A disc autochanger comprising:
   a plurality of disc holding members configured to hold a plurality of discs;
   a splitting member configured to be inserted between two adjacent disc holding members for splitting said adjacent disc holding members; and
   an elevator mechanism configured to raise or lower said plurality of disc holding members to an insertion position for insertion of said splitting member therebetween and to lower a first portion of said disc holding members positioned below said insertion position to enable insertion of a playback part while not moving a second portion of said disc holding members positioned above said insertion position.

2. A disc autochanger as set forth in claim 1, further provided with a detector for making said elevator mechanism shift in an elevation direction to move said disc holding members and detecting at least one shift position for making that movement stop at a position facing said splitting member, a storage unit for storing a number of a disk to be played back, and a controller for controlling the drive of said splitting member and said elevator mechanism in accordance with outputs of said storage unit and said detector.

3. A disc autochanger as set forth in claim 2, wherein said controller holds a correspondence table between at least one shift position to be taken by each of said plurality of discs and said disc numbers.

4. A disc autochanger as set forth in claim 2, wherein said detector is comprised of a fixed base member and sensor units provided at said fixed base member and connected to said controller, and said sensor units detect said shift positions of said elevator mechanism.

5. A disc autochanger as set forth in claim 2, wherein said detector is comprised of a base member and sensor units provided at said base member and connected to said controller, said sensor units are arranged at shift positions corresponding to predetermined positions of said elevation direction at which said disc holding member should stop, and said base member can move to the shift positions corresponding to said disc holding members.

6. A disc autochanger as set forth in claim 2, wherein said storage unit is comprised of a nonvolatile memory storing the number of a disc to be played back.

7. A disc autochanger as set forth in claim 2, wherein said storage unit is comprised of a drive mechanism driven based on the output of said controller and a sensor detecting dynamic changes of said drive mechanism and calculates the number of the disc to be played back from the value of the output of said sensor.

8. A disc autochanger as set forth in claim 1, wherein said disc autochanger records on the discs.

9. A disc autochanger comprising:
a plurality of disc holding members configured to hold a plurality of discs;
a table seat member for supporting said plurality of disc holding members;
an elevator mechanism configured to raise or lower said table seat member; and
a splitting member configured to be inserted between two adjacent disc holding members positioned by said elevator mechanism, said elevator mechanism further configured to lower said table seat member after said splitting member is inserted into said disc holding members, while the splitting member keeps a portion of the plurality of disc holding members positioned above the splitting member from moving down.

10. A disc autochanger comprising:
a plurality of disc holding members configured to hold a plurality of discs;
a playback part;
a table seat member for supporting said plurality of disc holding members;
an elevator mechanism configured to raise or lower said table seat member; and
a splitting member configured to be inserted between two adjacent disc holding members positioned by said elevator mechanism, said elevator mechanism further configured to lower said table seat member after said splitting member is inserted into said disc holding members to form a separate space by separating said disc holding members into first disc holding members supported by said splitting member and second disc holding members supported by said table seat member, wherein said playback part is configured to play back a disc in the formed separated space.

11. A disc autochanger as set forth in claim 9 or 10, having a controller provided with a position detector for detecting a position of said table seat member and controlling said elevator mechanism based on said position detector so as to move said table seat member to a position corresponding to a desired separation position of disc stockers.

* * * * *